United States Patent
Riley et al.

(10) Patent No.: US 7,936,949 B2
(45) Date of Patent: *May 3, 2011

(54) PANCHROMATIC MODULATION OF MULTISPECTRAL IMAGERY

(75) Inventors: Ronald Alan Riley, West Melbourne, FL (US); Tariq Bakir, Melbourne, FL (US); Adrian M. Peter, Gainesville, FL (US); Morteza Akbari, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 929 days.

This patent is subject to a terminal disclaimer.

(21) Appl. No.: 11/565,708

(22) Filed: Dec. 1, 2006

(65) Prior Publication Data

US 2008/0131025 A1    Jun. 5, 2008

(51) Int. Cl.
G06K 9/00    (2006.01)
G06K 9/40    (2006.01)
G06K 9/32    (2006.01)
G06K 9/36    (2006.01)
G09G 5/00    (2006.01)
G09G 5/02    (2006.01)

(52) U.S. Cl. ........ 382/299; 382/100; 382/162; 382/254; 382/276; 345/589; 345/606

(58) Field of Classification Search ............ 382/100, 382/162, 254, 274, 276, 284, 293, 299; 348/362, 348/364; 345/589
See application file for complete search history.

(56) References Cited

U.S. PATENT DOCUMENTS 5,034,986 A    7/1991  Karmann et al.
5,265,172 A   11/1993  Markandey et al.
5,324,113 A    6/1994  Ingram, Jr. et al.
5,627,905 A    5/1997  Sebok et al.
5,680,487 A   10/1997  Markandey (Continued)

FOREIGN PATENT DOCUMENTS

WO    WO 98/41079    9/1998

(Continued)

OTHER PUBLICATIONS

Aiazzi et al, "Context-Driven Fusion of High Spatial and Spectral Resolution Images Based on Oversampled Multiresolution Analysis", IEEE Transactions on Geoscience and Remote Sensing, vol. 40, No. 10, Oct. 2002.*

(Continued)

Primary Examiner — Vu Le
Assistant Examiner — Nathan Bloom
(74) Attorney, Agent, or Firm — Fox Rothschild, LLP; Robert J. Sacco

(57) ABSTRACT

Method and system for creating a fused image from an image pair. The method includes obtaining (204) image data defining a first image of a panchromatic image type and a second image of a multi-spectral image type. The first image has a first spatial resolution and a first spectral resolution. The second image has a second spatial resolution which is lower than the first spatial resolution and a second spectral resolution higher than the first spectral resolution. The first image and the second image are fused (216) to initialize a fused image having the first spatial resolution and the second spectral resolution. A point spread function and a set of spectral weights are used to determine scaling factors for scaling (218) radiance value of pixels defining the fused image in accordance with radiance value of pixels forming the first image and the second image.

26 Claims, 11 Drawing Sheets

U.S. PATENT DOCUMENTS

| | | | |
|---|---|---|---|
| 5,884,226 | A | 3/1999 | Anderson et al. |
| 5,949,914 | A | 9/1999 | Yuen |
| 6,011,875 | A | 1/2000 | Laben et al. |
| 6,097,835 | A | 8/2000 | Lindgren |
| 6,937,774 | B1 | 8/2005 | Specht et al. |
| 7,298,922 | B1 | 11/2007 | Lindgren et al. |
| 2002/0096622 | A1 | 7/2002 | Adler-Golden et al. |
| 2004/0075667 | A1 | 4/2004 | Burky et al. |
| 2004/0130702 | A1 | 7/2004 | Jupp et al. |
| 2004/0141659 | A1* | 7/2004 | Zhang ............ 382/284 |
| 2004/0164235 | A1 | 8/2004 | Miller |
| 2004/0264796 | A1 | 12/2004 | Turner et al. |
| 2005/0094887 | A1 | 5/2005 | Cakir et al. |
| 2005/0111754 | A1 | 5/2005 | Cakir et al. |
| 2006/0126959 | A1 | 6/2006 | Padwick et al. |
| 2006/0269158 | A1 | 11/2006 | O'Hara et al. |
| 2008/0037865 | A1 | 2/2008 | Vetter et al. |
| 2008/0037869 | A1 | 2/2008 | Zhou |
| 2008/0112649 | A1 | 5/2008 | Chen et al. |
| 2008/0129752 | A1 | 6/2008 | Riley et al. |
| 2008/0131024 | A1 | 6/2008 | Riley et al. |
| 2008/0131025 | A1 | 6/2008 | Riley et al. |
| 2010/0002947 | A1 | 1/2010 | Riley et al. |
| 2010/0008595 | A1 | 1/2010 | Riley et al. |
| 2010/0008598 | A1 | 1/2010 | Riley et al. |
| 2010/0189363 | A1 | 7/2010 | Riley et al. |
| 2010/0226570 | A1 | 9/2010 | Riley et al. |

FOREIGN PATENT DOCUMENTS

| | | | |
|---|---|---|---|
| WO | WO 2006/065741 | A2 | 6/2006 |
| WO | WO 2008/070542 | A1 | 6/2008 |
| WO | WO 2008/070544 | A2 | 6/2008 |

OTHER PUBLICATIONS

Yun Zhang, "Understanding Image Fusion", Phogrammetric Engineering and Remote Sensing, Jun. 2004.*

Hardie, Eismann, and Wilson, "MAP Estimation for Hyperspectral Image Resolution Enhancement Using an Auxiliary Sensor", IEEE Transactions on Image Processing, vol. 13, No. 9, Sep. 2004.*

Aiazzi et al, "An MTF-Based Distortion Minimized Model for Pan-Sharpening of Very High Resolution Multispectral Images of Urban Areas", 2nd GRSS/ISPRS Joint Workshop on "Data Fusion and Remote Sensing over Urban Areas" 2003.*

Thomas et al., "Synthesis of Multispectral Images to High Spatial Resolution: A Critical Review of Fusion Methods Based on Remote Sensing Physics", IEEE Transactions on Geoscience and Remote Sensing, vol. 46, No. 5, May 2008.*

Aanaes, H., et al., "Spectrally Consistent Satellite Image Fusion With Improved Image Priors". 2006 7th Nordic Signal Processing Symposium (IEEE CAT. No. 06EX1392) IEEE Piscataway, NJ USA, Jun. 7 2006-Jun. 9, 2006, pp. 14-17, XP002482502; ISBN: 1-4244-0413-4.

Garzelli, A., et al., "Interband Structure Modeling for Pan-Sharpening of Very High-Resolution Multispectral Images", Information Fusion, Elsevier, vol. 6, No. 3, Sep. 2005, pp. 213-224, XP004858824, ISSN 1566-2535.

Ranchin, et al., "Image Fusion—The ARSIS Concept and Some Successful Implementation Schemes" ISPRS J. Photogramm. Remote Sens.; ISPRS Journal of Photogrammetry and Remote Sensing, Jun. 2003, vol. 58, No. 1-2, Jun. 2003, pp. 4-18, XP002469989, pp. 5-10.

Eismann, et al., "Hyperspectral Resolution Enhancement Using High-Resolution Multispectral Imagery With Arbitrary Response Functions", IEEE Transactions on Geoscience and Remote Sensing, IEEE Center, Piscataway, NJ, US., vol. 43, No. 3, Mar. 2005, pp. 45-465, ISSN: 0196-2892, p. 456-p. 459.

Ager; , Thomas, et al.,: "Geopositional accuracy evaluation of QuickBird ortho-ready standard 2A multispectral imagery" Proceedings SPIE, Algorithms and Technologies for Multispectral, Hyperspectral, and Ultraspectral Imagery X, Aug. 12, 2004, pp. 488-499, XPO40185047.

Becker, S., Haala, N., Reulke, R. 2005. Determination and Improvement of Spatial Resolution for Digital Aerial Images. Proceedings of ISPRS Hannover Workshop 2005: High-Resolution Earth Imaging for Geospatial Information, unpaginated CD-ROM, 6p.

Liu, J.G., "Smoothing Filter Based Intensity Modulation: A Spectral Preserve Image Fusion Technique for Improving Spatial Details", Int. J. Remote Sensing, Dec. 2000, pp. 3461-3472, vol. 21, No. 18.

Perkins, T, et al.: "Retrieval of atmospheric properties from hyper and multispectral imagery with the FLASH atmospheric correction algorithm" SPIE, PO Box 10 Bellingham WA 98227-0010 USA, vol. 5979, Oct. 31, 2005, XP040211109.

Richter et al.: "Influence of the Adjacency Effect on Ground Reflectance Measurements", IEEE Geoscience and Remote Sensing Letters, IEEE Service Center, New York, NY, US, vol. 3, No. 4, ,Oct. 1, 2006, pp. 565-569, XP011149586, ISSN 1545-598X.

Kim, Y., et al, An Experimental Study on the Image-Based Atmospheric Correction Method for High Resolution Multispectral Data, Geoscience and Remote Sensing Symposium, 2005, lgarss 2005, Proceedings, 2005 IEEE International Seoul, Korea, Jul. 25-29, 2005, pp. 434-436, vol. 1, Piscataway, New Jersey USA.

Harris Corporation, International Patent Application No. PCT/US2007/086032; International Search Report mailed May 6, 2008.

Harris Corporation, International Patent Application No. PCT/US2009/049750; International Search Report mailed Jan. 20, 2010.

Harris Corporation, International Patent Application No. PCT/US2010/020868; International Search Report mailed Mar. 29, 2010.

Harris Corporation, International Patent Application No. PCT/US2009/049738; International Search Report mailed Sep. 7, 2009.

Beisl U.: "BDRF Correction in Hyperspectral Imagery", European Space Agency—Publications, 2001, XP002589098.

Beisl, U., et al: "Correction of Atmospheric and Bidirectional Effects in Multispectral ADS40 Images for Mapping Purposes", Internet, Intl. Arch. Photogramm. Remote Sens 2004, XP002588221, Retrieved from the Internet: URL:http://www2.geog.ucl.ac.uk/{mdisney/teaching/PPRS/PPRS_5/orig/atmos_empirical.pdf [retrieved on Jun. 14, 2010].

Price J.C.: "Combining Panchromatic and Multispectral Imagery from Dual Resolution Satellite Instruments", Remote Sensing of Environment, No. 21; 1987, pp. 119-128, XP002588220.

Schiefer, S. et al: Correcting Brightness Gradient in Hyperspectral Data From Urban Areas, Remote Sensing of Environment, No. 101, 2006, pp. 25-37, XP002588219.

Schowengerdt, R.: "Remote Sensing: Models and Methods for Image Processing", Dec. 31, 2007, Academic Press, XP002558565, ISBN: 9780123694072.

Khan, M.M. et al: "Indusion: Fusion of Multispectral and Panchromatic Images Using the Induction Scaling Technique", IEEE Geoscience and Remote Sensing Letters, IEEE Service Center, Jan. 1, 2008, pp. 98-102, vol. 5, No. 1, New York, New York US, XP011197256.

Xu, C, et al: "Evaluation of the Surface Reflectance Retrieval on the Satellite Data", SPIE, PO Box 10, Bellingham WA 98227-0010 USA, vol. 6752, Aug. 8, 2007, XP040247396.

Bunting P et al: "An Area based Technique for Image-to-Image Registration of Multi-Modal Remote Sensing Data", Geoscience and Remote Sensing Symposium, 2008. IGARSS 2008. IEEE International, IEEE, Piscataway, NJ, USA, Jul. 7, 2008, pp. V-212, XP031423198.

Walli K C: "Automated multisensor image registration", Applied Imagery Pattern Recognition Workshop, 2003. Proceedings. 32ND Washington, DC, USA Oct. 5-17, 2003, Piscataway, NJ, USA, IEEE, Oct. 15, 2003, pp. 103-107, XP010695062.

Lemoigne J. et al: "Use of Multiresolution Wavelet Feature Pyramids for Automatic Registration of Multisensor Imagery", IEEE Transactions on Image Processing, IEEE Service Center, Piscataway, NJ, US, vol. 14, No. 6, Jun. 1, 2005, pp. 770-782, XP011131847.

Chi-Farn Chen et al: "Fully Automatic and Robust Approach for Remote Sensing Image Registration", Nov. 13, 2007, Progress in Pattern Recognition, Image Analysis and Applications; [Lecture Notes in Computer Science], Springer Berlin Heidelberg, Berlin, Heidelberg, pp. 891-900, XP019083038.

International Search Report mailed Jan. 11, 2011; International Application No. PCT/US2009/049855 in the name of Harris Corporation.

* cited by examiner

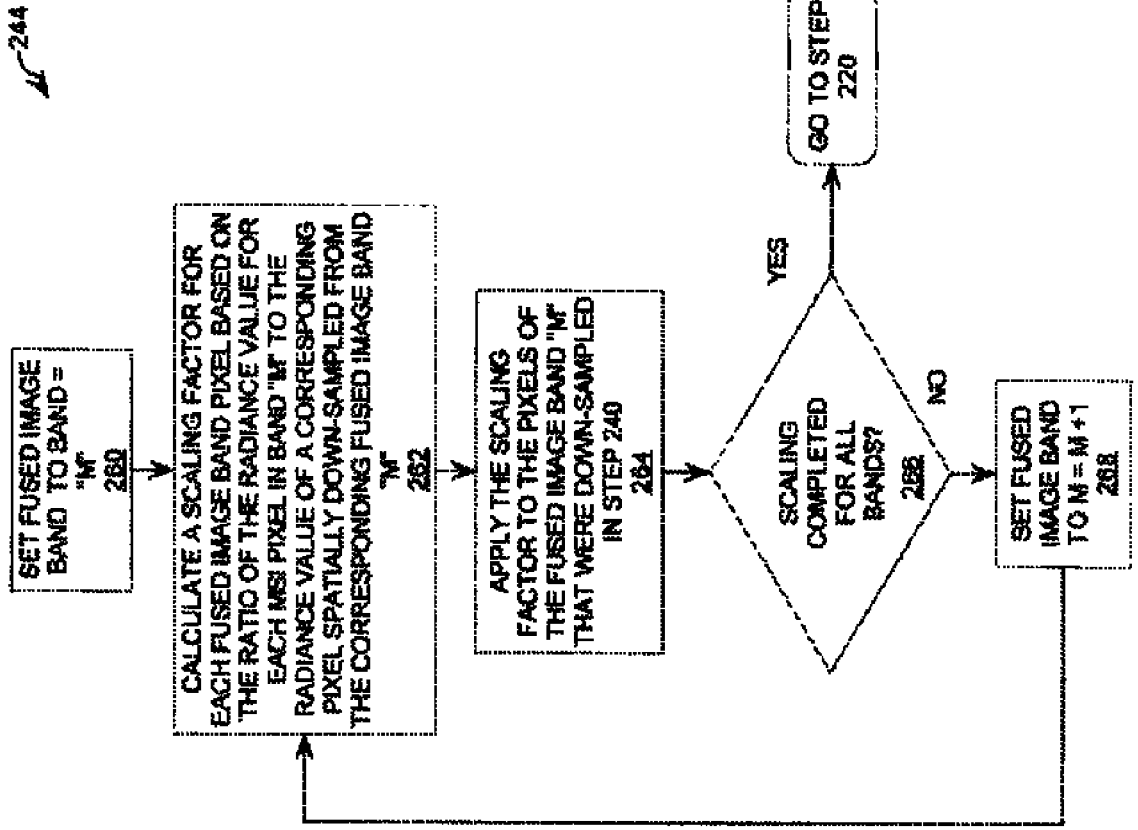

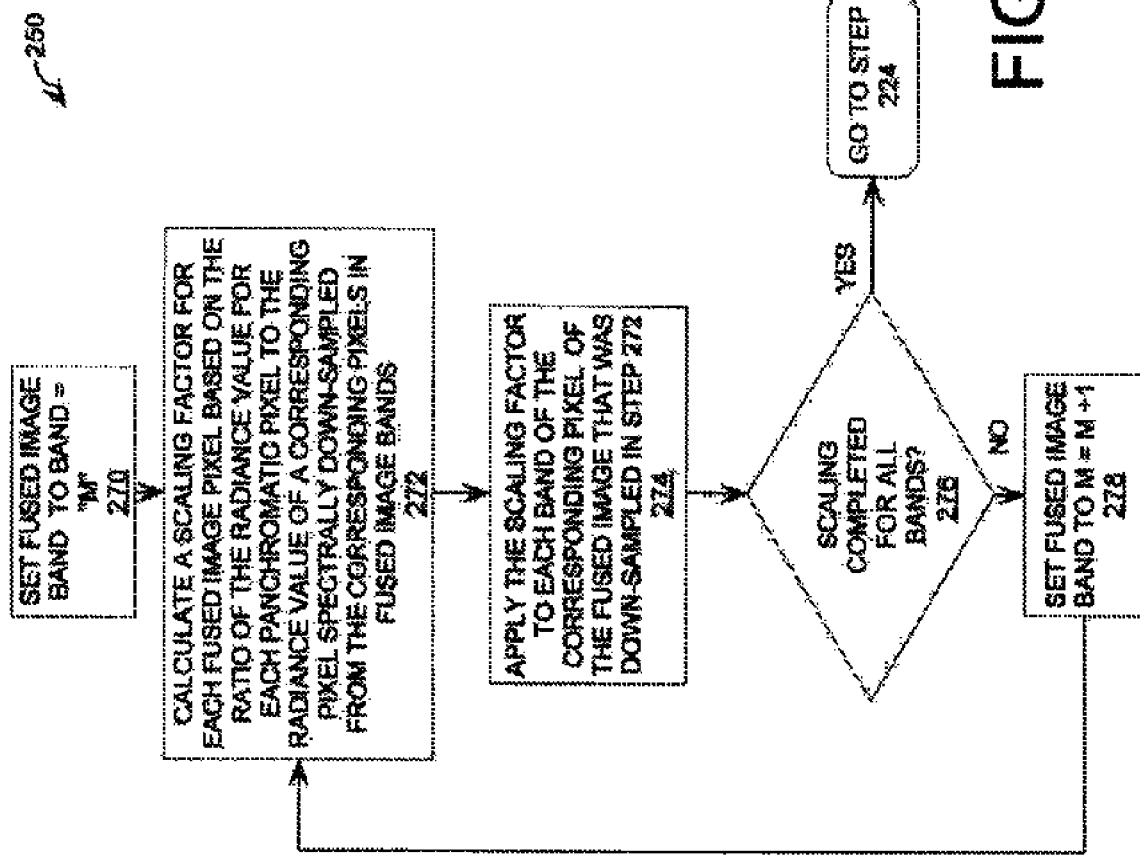

PANCHROMATIC MODULATION OF MULTISPECTRAL IMAGERY

BACKGROUND OF THE INVENTION

1. Statement of the Technical Field

The invention concerns image processing, and more particularly an image processing method for fusing an image pair comprising a panchromatic image and a multispectral image.

2. Description of the Related Art

In the field of remote image sensing, two common types of images include panchromatic imagery and multi-spectral imagery. Panchromatic imagery is imagery that is obtained by a remote sensing device with a sensor designed to detect electromagnetic energy in only one very broad band. This one very broad band typically includes most of the wavelengths of visible light. Panchromatic imagery has the advantage of offering very high spatial resolution. In contrast multi-spectral imagery is typically created from several narrow spectral bands within the visible light region and the near infrared region. Consequently, a multi-spectral image is generally comprised of two or more image data sets, each created by sensors responsive to different portions of the optical spectrum (e.g., blue, green, red, infrared). Multi-spectral images are advantageous because they contain spectral information which is not available from a similar panchromatic image. However, multi-spectral images typically have a lower spatial resolution as compared to panchromatic images.

It is often desirable to enhance a multi-spectral image with the high resolution of a panchromatic image, in order to achieve this result, it is known in the art that the images can be combined or "fused". In general, there are two key problems that must be solved in order to accomplish this fusing process. The first problem concerns a need for registration of the two images. The registration process involves a determination of where each pixel in the panchromatic image maps to in the multi-spectral image. This process must generally be accomplished with great accuracy for best results. For example, it is desirable for each pixel in the pan image to be mapped to the multi-spectral image with an accuracy of less than 0.1 panchromatic pixel radius. A number of conventional methods exist for achieving this mapping. The second problem that must be overcome when performing the fusing process is to ensure that the radiance values of the fused image remain consistent with (1) the original multi-spectral image and (2) the original panchromatic image.

Conventional algorithms utilized for performing the image fusion process suffer from several limitations, for example, they generally make simplistic assumptions about the manner in which the high spatial resolution pixels in the panchromatic images should be combined or fused with the high spectral resolution pixels of the multi-spectral image. Typically, these include (1) an assumption that high spatial resolution pixels from the panchromatic image down-sample to the low spatial resolution of the multi-spectral image as a box average; and (2) an assumption that the pixels from the panchromatic image are evenly weighted averages of red, green and blue spectral bands.

Some algorithms have also adopted a slightly more sophisticated approach with regard to the process of down-sampling pixels from the high resolution of the panchromatic image to the relatively low resolution of the multi-spectral image. For example, in some algorithms, the high spatial resolution pixels from the panchromatic image are not merely down-sampled as a box average. Instead, a point spread function (PSF) is used to determine the manner in which the high spatial resolution pixels from the panchromatic image are down-sampled to the pixels consistent with the multi-spectral image. The PSF sometimes referred to as instrument line shape) is a characterization of the manner in which a point of light is blurred or diffused by a sensor and its associated optics. Accordingly, knowledge regarding the PSF of a sensor can be useful for down-sampling the high spatial resolution pixels from the panchromatic image to the multi-spectral image. In particular, the PSF can be used to define a weighting system for combining individual ones of a plurality of high resolution pixels to form a single larger pixel at lower resolution. However, the PSF in conventional algorithms has merely been approximated based on sensor geometry data, such as aperture, focal plane resolution, and so on. As such, the PSF that is used is not necessarily an accurate representation of the true PSF for a sensor system. Further, a precomputed PSF will not contain information specific to a given image pair such as residual shift error in the registration and artifacts of image preprocessing.

In view of the foregoing, there is a need for an improved method for fusing an image pair comprising a multi-spectral image and a panchromatic image

SUMMARY OF THE INVENTION

The invention concerns a method and system for creating a fused image from an image pair comprising a high resolution panchromatic image and lower resolution multi-spectral image. The method begins by obtaining image data defining a first image of a panchromatic image type and a second image of a multi-spectral image type. The first image has a first spatial resolution and a first spectral resolution. The second image has a second spatial resolution which is lower than the first spatial resolution and a second spectral resolution higher than the first spectral resolution. A registration process is thereafter performed on the image pair to provide a geometric mapping of points in the first image to corresponding locations in the second image.

The method also includes a step of concurrently calculating a point-spread function $\Psi_{i,j}$ for down-sampling the first image to the second spatial resolution, and a set of weights $W_\lambda$ for down-sampling the second image to the first spectral resolution. The point spread function and the set of weights are specifically optimized to the unique characteristics of the image pair. The calculating step of the method includes building a matrix equation for concurrently solving for $\Psi_{i,j}$ and $W_\lambda$. A least-squared error method is advantageously used for solving the matrix equation. Using this technique, the point spread function and the set of spectral weights can be calculated to minimize the squared error of radiance when each of the images comprising the image pair are mapped to a common low resolution pan image. For example, the common low resolution can be the second spatial resolution and the first spectral resolution. Once obtained, the set of weights are used to form a fused image having the first spatial resolution and the second spectral resolution.

The calculating step referenced above advantageously includes concurrently solving for $\Psi_{i,j}$ and $W_\lambda$ in the equation $$\sum_{i,j} p_{i,j}\Psi_{i,j} = P = \sum_\lambda W_\lambda M_\lambda + P_0$$

where P is the radiance of a pixel down-sampled to the second spatial resolution, $W_\lambda$ is the spectral weight for a spectral hand λ comprising the multi-spectral image, $M_\lambda$ is the radiance value of a pixel for each spectral band comprising the second image, $P_0$ is a constant offset value, $p_{i,j}$ is the radiance value of a pixel comprising the panchromatic image; and $\Psi_{i,j}$ is the point spread function. The calculating step can also include building a matrix equation for concurrently solving for $\Psi_{i,j}$ and $W_\lambda$, and solving the matrix equation using a least squares fit method.

The method also includes fusing the first image and the second image to initialize a fused image having the first spatial resolution and the second spectral resolution. Thereafter, the point spread function and the set of weights are used to determine scaling factors for scaling radiance value of pixels defining the fused image in accordance with radiance value of pixels forming the first image and the second image. This step involves using the point spread function and the set of weights to down-sample the fused image to each of the first spectral resolution and the second spatial resolution. The scaling step further includes scaling the pixel radiance values of the fused image to be consistent with the pixel radiance values of the second image, blurring the fused image, and scaling the pixel radiance values of the fused image to be consistent with the pixel radiance value of the first image.

According to another aspect, the invention includes a system for creating a fused image from an image pair comprising a high resolution panchromatic image and lower resolution multi-spectral image. The system includes a data store for storing image data defining a first image and image data defining a second image. The first image type is a panchromatic image type and the second image type is a multi-spectral image type. The first image has a first spatial resolution and a first spectral resolution. The second image has a second spatial resolution lower than the first spatial resolution. The second image also has a second spectral resolution higher than the first spectral resolution.

The system also includes a computer processing system programmed with a suitable set of instructions for implementing the process described above. Consequently, the computer processing system is configured for concurrently calculating a point spread function for down-sampling the first image to the second spatial resolution, and a set of weights for down-sampling the second image to the first spectral resolution. The computer processing system is also configured for using the set of weights for forming a fused image having the first spatial resolution and the second spectral resolution. Significantly, the point spread function and the set of weights calculated by the computer processing system are specifically optimized to the unique characteristics of the image pair using the methods described above.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not fee construed as limited to the embodiments set forth herein. For example, the present invention can be embodied as a method, a data processing system, or a computer program product. Accordingly, the present invention can lake the form as an entirely hardware embodiment, an entirely software embodiment, or a hardware/software embodiment.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Embodiment of the present invention will now be described with respect to FIG. 1 through FIG. 8. Some embodiments of the present invention provide methods, systems, and apparatus relating to image fusion functions including obtaining image data, registering the image data, determining calibration coefficients, and applying the calibration coefficients to specific image data. Accordingly, an embodiment including the listed functions is discussed further below.

Figure 1:
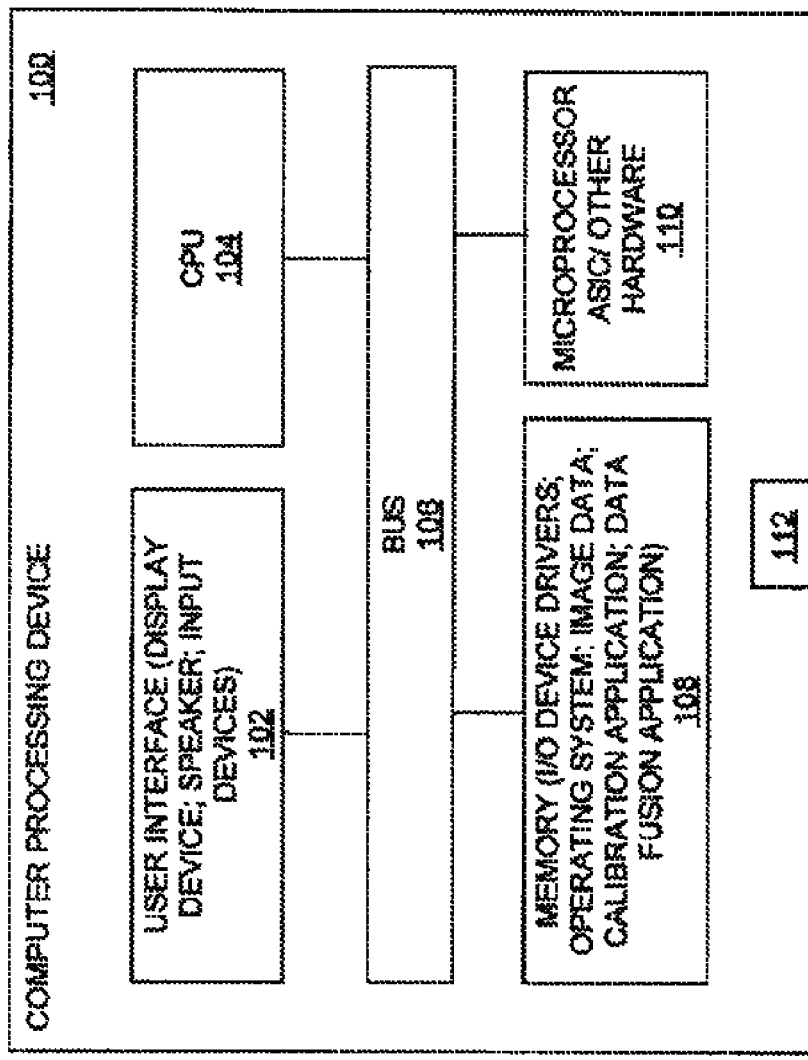
FIG. 1 is a block diagram of a computer processing device that is useful for understanding the invention.

Referring now to FIG. 1, there is provided a block diagram of a computer processing device 100. Computer processing device 100 is comprised of a system interface 112, a user interface 102, a central processing unit 104, a system bus 108, a memory 108 connected to and accessible by other portions of the computer processing device 100 through system bus 106, and hardware entities 110 connected to system bus 106. At least some of the hardware entities 110 perform actions involving access to and use of memory 108, which may be a RAM, a disk driver, and/or a CD-ROM.

User interface 102 facilitates a user action to create a request to access and launch a calibration application and/or a fusion application. User interface 102 may comprise a display screen, speakers, and an input means, such as a keypad, directional pad, a directional knob, and/or a microphone.

System interface 112 allows the computer processing device 100 to communicate with external computer processing devices through the internet, LAN, or WAN. System interface 112 also allows the computer processing device 100 to send and retrieve data from one or more external databases.

Memory 108 can include I/O device driver program code and operating system program code. Memory 108 can also include image data, calibration applications program code, and fusion applications program code. In accordance with one aspect of the invention, the image data can include high spectral data such as a multi-spectral image. The image data can also include high spatial resolution such as a panchromatic image.

Hardware entities 110 may include microprocessors, ASICs, and other hardware. Hardware entitles 110 may include microprocessors programmed with an I/O device drivers and an operating system. Hardware entities 110 may also include a microprocessor programmed with a computer software routine for performing an image fusion process. The image fusion process will be described in greater detail below in relation to FIG. 2. Hardware entitles 110 may further include a microprocessor programmed with a fusion application for combining two or more images to provide increased image content.

Those skilled in the art will appreciate that the computer processing device architecture illustrated in FIG. 1 is one possible example of a computer processing device. However, the invention is not limited in this regard and any other suitable computer processing device architecture can also be used without limitation.

The present invention will now be described in greater detail in relation to the flowchart in FIG. 2. The image fusion process disclosed herein is useful for fusing a panchromatic and multi-spectral image pair. It should be appreciated, however, that the process disclosed in FIG. 2 is provided for purposes of illustration only and that the present invention is not limited in this regard. It should be understood that computer program code for carrying out the processes and routines of the present invention can be written in an object orientated programming language such as Java®, Smalltalk, C++, or Visual Basic. However, the computer program code for carrying out the present invention can also be written in conventional procedural programming languages, such as "C" programming language.

As used herein, the terms "fusing" or "fused image" respectively refers to a process, or an image obtained from such a process, in which a high resolution panchromatic image is used to sharpen the resolution of the relatively low resolution multi-spectral imagery. The term "image pair" refers to a high resolution panchromatic image and a relatively low resolution multi-spectral image of the same surface or subject matter. Thus, the panchromatic image and the multi-spectral image are each comprised of image data that is closely related.

Figure 2A:
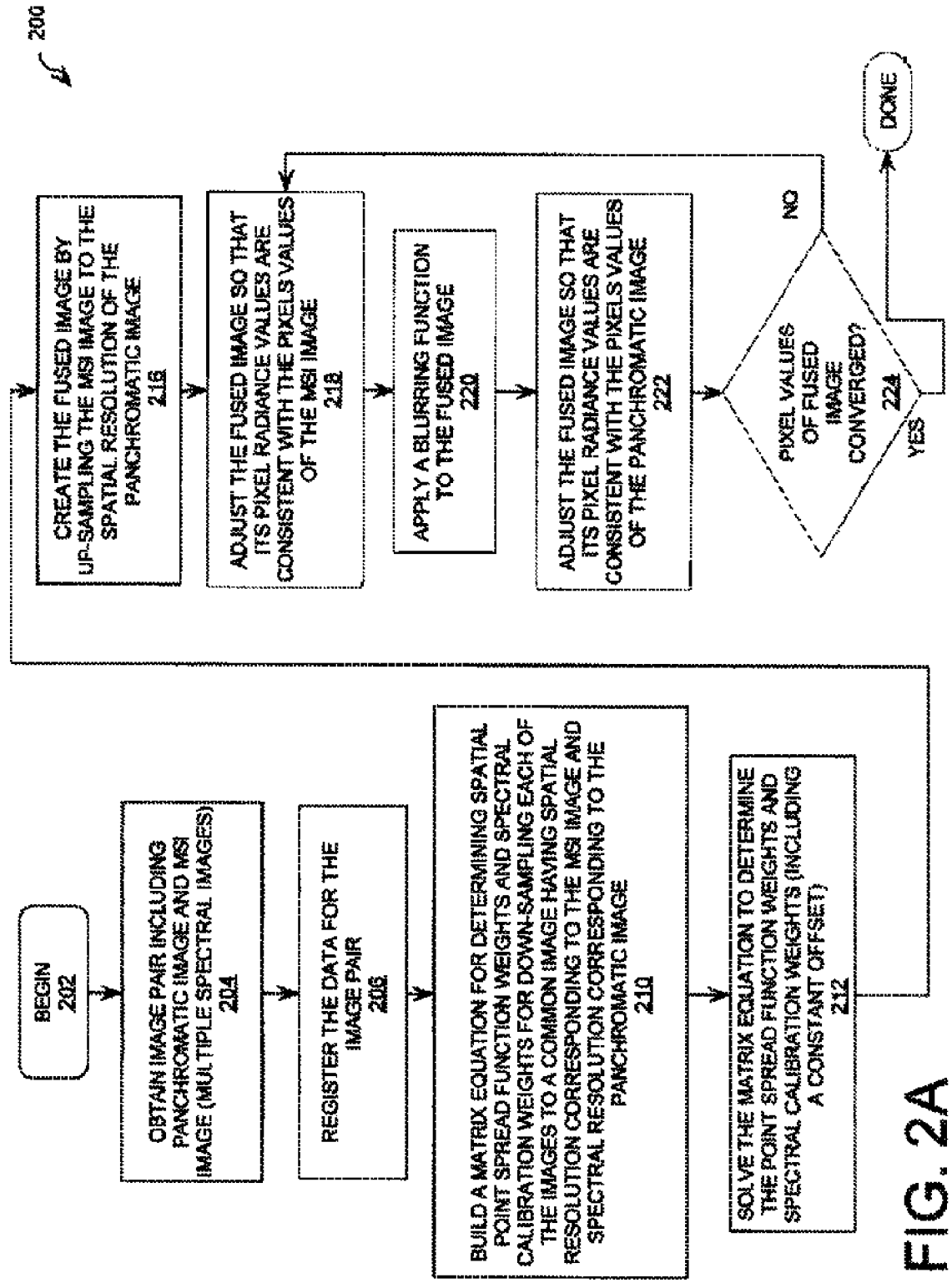
FIG. 2 is a flow diagram of a process for fusing a panchromatic image with a multi-spectral image.

Referring to FIG. 2A, a process 200 can begin in step 202 and continue to step 204. In step 204 image data is obtained for an image pair comprised of a multi-spectral image and a panchromatic image. It will be appreciated by those skilled in the art that a fused image will be of little value if the surface imaged by a panchromatic image does not significantly overlap with the surface imaged by the multispectral image. Accordingly, it should be understood that the image pairs referred to herein are advantageously selected to be of a common subject matter or common surface area. For example, the images can be of a common geographic area of the earth.

The image pairs described herein are further assumed to have certain other characteristics. During the time between collection of the panchromatic and multi-spectral image, moving objects such as vehicles and ocean waves are not likely to be registered correctly between the two images, leading to error in registration and calibration. If the time between the acquisitions of the images is more than a few minutes, the change in position of the sun will result in significant changes in shadows and variations in the illumination of the surface based on how well the surface normals are aligned with the sun. This can result in significant calibration and registration errors. If days pass between the collection of panchromatic and multi-spectral image, there can be significant changes in atmospheric conditions, if months pass, there can be significant changes in the surface properties due to ice, snow, rain, leaves falling from the trees, new growth. Accordingly, it is generally preferred that the panchromatic and multi-spectral image comprising each image pair are acquired from nearly the same position so as to reduce such errors. This significantly simplifies the registration process to little more than shift, scale, and rotation. The registration process is discussed in more detail in relation to step 208.

It will be appreciated that the panchromatic and multi-spectral image pair are preferably acquired within a very short time frame of each other. For example, each image is advantageously acquired within one minute of the other. Still, it will be understood by those skilled in the art that the present invention can be utilized in connection with image pairs that do not satisfy these criteria, with degraded results. For example, the process cart be used for image pairs obtained with different sensors platforms at approximately the same time.

In step 204, the image data can be processed by control processing unit 104 and stored in memory 108. The image data includes pixel data. Control processing unit 104 can be configured for populating memory 108 in a table format with such pixel data. The pixel data for the multi-spectral image data can include each pixel's electromagnetic wavelength characteristic, location on a grid, and radiance value. The pixel data associated with a panchromatic, image can also be processed by control processing unit 104 and stored in memory 108. The pixel data for the panchromatic image can include radiance data for each pixel associated with the panchromatic image. Control processing unit 104 can be configured for populating memory 108 in accordance with a table format such that the panchromatic image data is associated with pixel locations on a grid.

Once the images are obtained, the process can continue with step 208. Step 208 concerns registration of the data for the at least two images. Techniques for registering different sets of image data are well known to persons skilled in the art. Thus, such techniques will not be described in detail herein. However, it should be appreciated that any such technique known in the art can be used with the present invention.

In general, the registration step 206 involves a determination of where each point in the panchromatic image maps to in the multi-spectral image. The registration process must generally be accomplished with great accuracy for best results. A number of conventional methods exist for achieving this mapping. Typically, they involve selecting a number of points in one image, finding where they map to in the other image, and then optimizing the coefficients of a transform. This is usually a least squares error solution that permits one to obtain a set of coefficients that minimize the squared error of mapping points from one image to another. For best results in the fusing process, the panchromatic image is preferably mapped to the multi-spectral image with an accuracy defined by a error distance which is less than a dimension defined by 0.1 panchromatic pixel.

The registration process of step 208 determines the mapping of points from the coordinates of the panchromatic image to the coordinates of the multispectral image. This mapping can be as simple as a linear transformation of the following form;

$$x1 = a\,x2 + b\,y2 + x0$$

or a complex transformation modeling the geometry of both sensors and the surface imaged. As noted above, such techniques are well known in the art.

After registering the image data in step 208, the process continues on to step 210 for determining certain calibration values. These calibration values include (1) a set of weights which should be applied to the radiance values for the bands comprising the multi-spectral image so that they accurately correspond to the radiance values in the pixels of the panchromatic image; and (2) a point spread function (PSF) that accurately defines the manner in which radiance values for a plurality of pixels forming the panchromatic image should be combined to form a single radiance value of a single (lower spatial resolution) pixel of the multi-spectral image.

Before discussing the steps necessary to obtain the calibration values described above, it is helpful to first consider why these calibration values are necessary. As used herein, the term "radiance value" generally refers to a digital value assigned to a pixel which is intended to represent the intensify of light energy received by a sensor at the location defined by that pixel. In this regard, it should be understood that these radiance-values may be scaled differently in two different sensors. Accordingly, it will be appreciated that the radiance values from the two different sensors must somehow be adjusted or scaled by using suitable weighting factors before the radiance values from the two different sensors can be combined together in a meaningful way.

Figure 3:
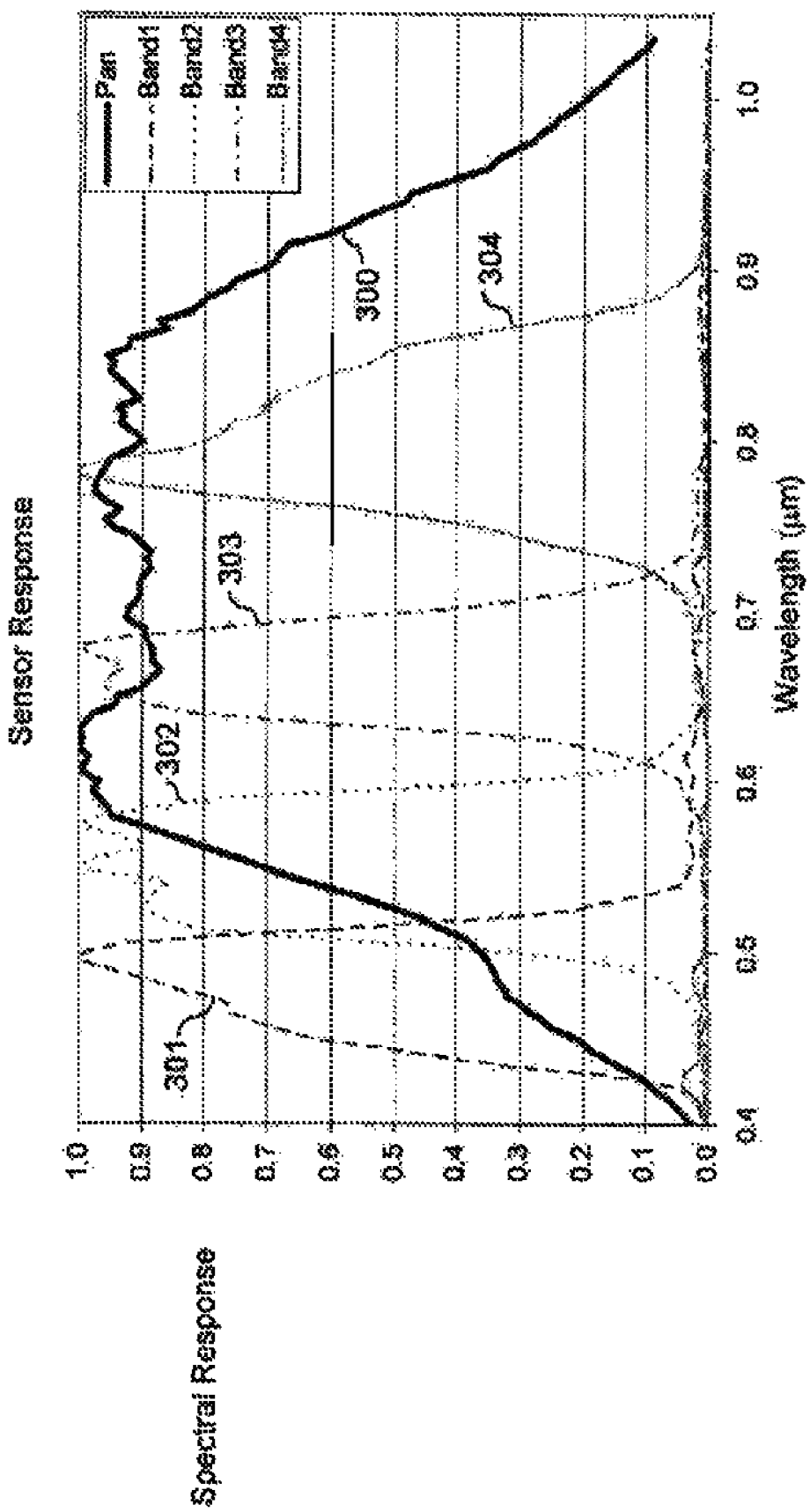
FIG. 3 is a plot showing an example of a spectral response of sensors used to create a panchromatic image and a multi-spectral image.

In the case of calibration values it must be understood that the complete multi-spectral image of a particular scene is actually comprised of several image bands. In each of the several image bands the sensor is responsive to a very limited range of optical wavelengths. This concept is illustrated in FIG. 3 which shows curves 301, 302, 303, 304 which represent a sensor's response to four different bands of optical wavelengths. The sensor essentially creates one image for each optical band represented by the response curves 301, 302, 303, 304. In this example, a single multi-spectral image would be comprised of images obtained by the sensor using these four spectral bands. Those skilled in the art will appreciate that different sensor systems can have more or fewer optical bands. In contrast, the panchromatic image is a single image which is obtained by a sensor that is responsive to a much wider range of optical wavelengths. In FIG. 3, the response of the panchromatic sensor is illustrated by curve 300.

In FIG. 3, it can be seen that the response curves 301, 302, 303, 304 of the sensor for the various multi-spectral bands can be very different as compared to the response curve 300 of the panchromatic sensor for the same wavelengths. These differences in the responsiveness of the sensor to the various optical bands will result in scaling differences as between the radiance values associated with each pixel for the multi-spectral image as compared to the panchromatic image.

Figure 4:
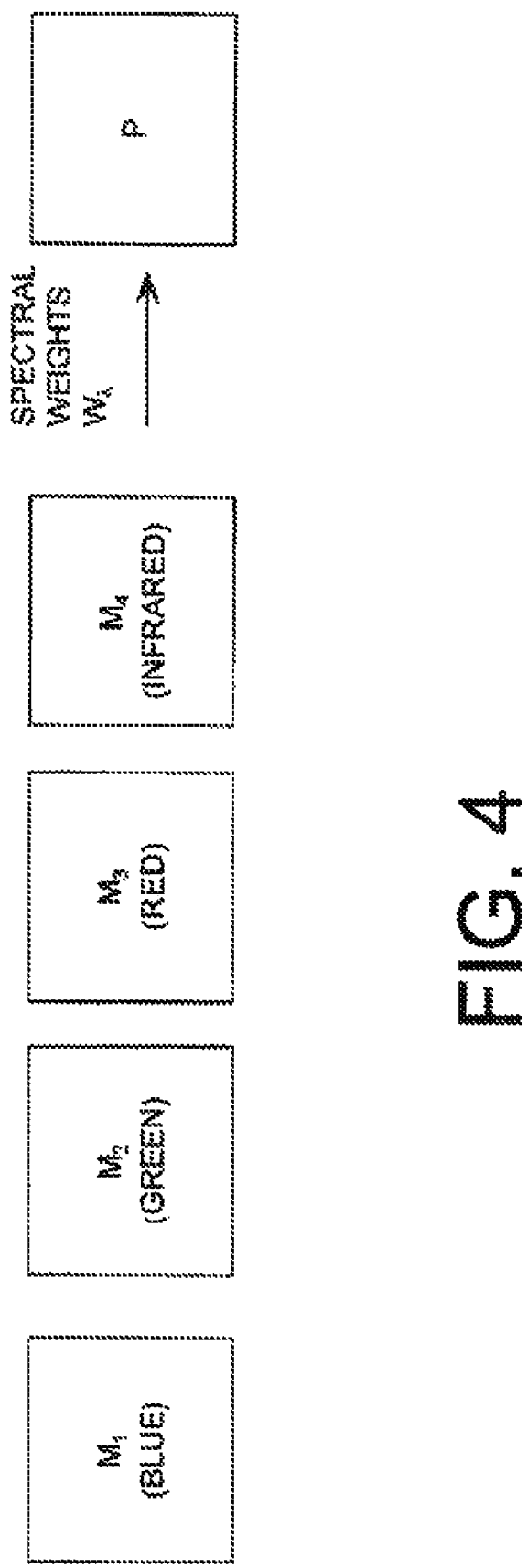
FIG. 4 is a conceptual illustration showing how spectral weights are used in a downsample processing of a multi-spectral image for decreasing the spatial resolution of the multi-spectral image.

The calibration values are used for scaling the radiance values for each pixel as measured by the multi-spectral sensor to correspond to the scaling of radiance values resulting from the panchromatic sensor. For example, consider the spectral response represented by curves 300 and 301 at 0.5 µm. The curve 301 has a spectral response of approximately 1.0 whereas the spectral response of the panchromatic sensor shows an average spectral response in the range of about 0.35. Ignoring for the moment the response of curve 302 in the wavelength range defined by curve 301, the radiance values for pixels in a multi-spectral image using a sensor having the characteristics of response curve 301 would likely need to be scaled by a weighting value of about 0.35 in order for such radiance values to be property calibrated to those values measured by a sensor having the response indicated by curve 300. In practice, proper spectral calibration would require that the pixel radiance values associated with each spectral band in FIG. 3 would need to be added together to obtain a total radiance value that is properly scaled to the radiance values obtained using a sensor having the response defined by curve 300. This process is illustrated in FIG. 4.

Mathematically, the foregoing process can be expressed as follows in Equation (1):

$$P_{i,j} = \sum_\lambda W_\lambda M_{i,j,\lambda} + P_0$$

Where:
$P_{i,j}$ is the pan radiance of each down-sampled pixel;
$W_\lambda$ is the spectral weight for each of the spectral bands;
$M_{i,j,\lambda}$ is the radiance value for each pixel for each spectral band comprising the multi-spectral image; and
$P_0$ is a constant offset value.

Figure 5:
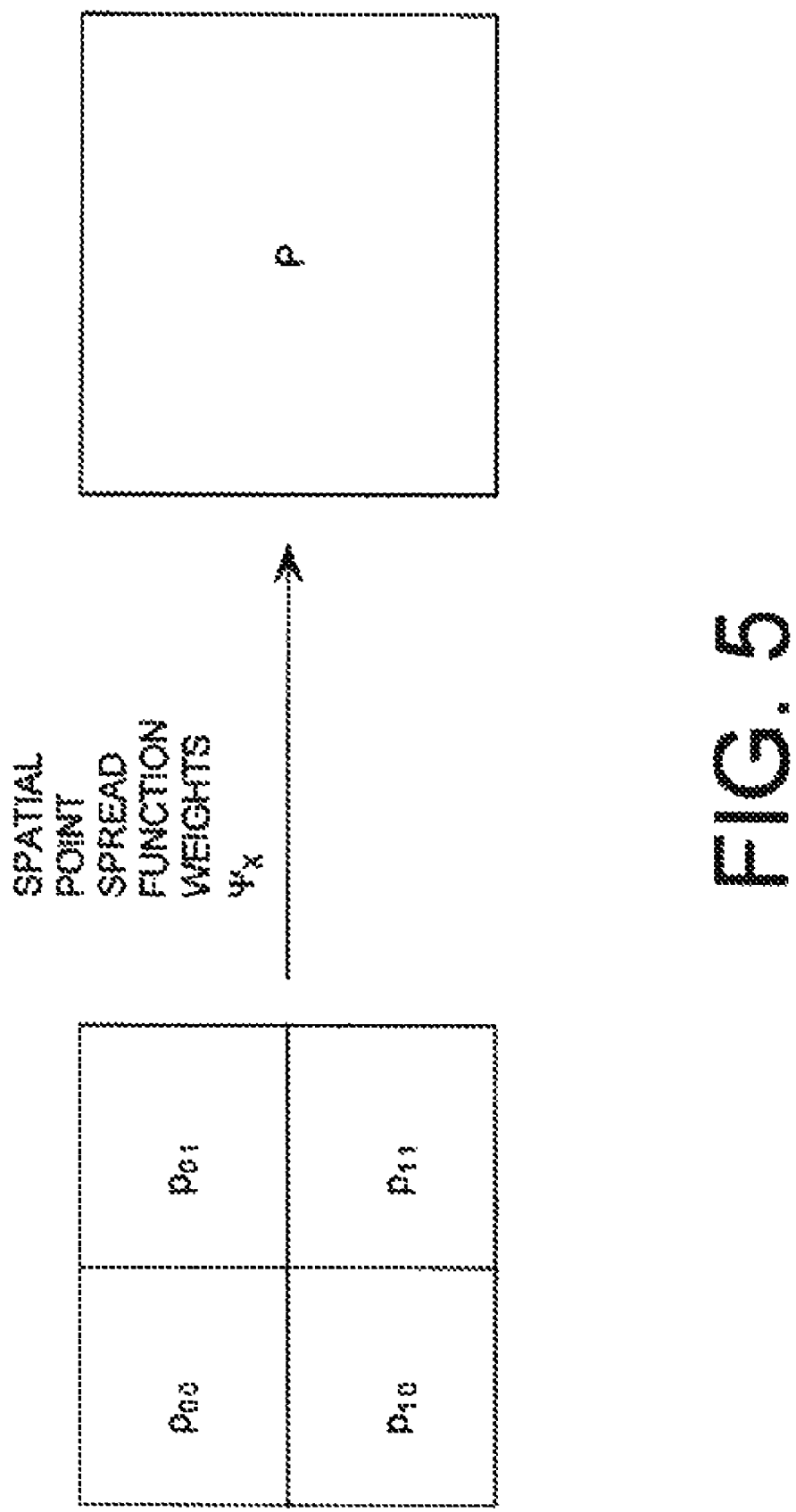
FIG. 5 is a conceptual illustration showing how a point spread function is used in a downsample processing of a panchromatic image for decreasing the spatial resolution of the panchromatic image.

Turning now to FIG. 5, it can be observed that the set of calibration values as referenced above involves spatial scaling rather than spectral scaling. Spatial clown-sampling involves down-sampling of radiance values of a plurality of high resolution pixels $p_{00}$, $p_{01}$, $p_{10}$, $p_{11}$ from the panchromatic image to determine a single radiance value for a single lower resolution pixel. A simple averaging process of the radiance values from the high resolution pixels will not give an accurate result because it does not properly account for the point spread function (PSF) associated with the optics, sensor, and other processing that may have been performed to generate the panchromatic image.

Figure 6:
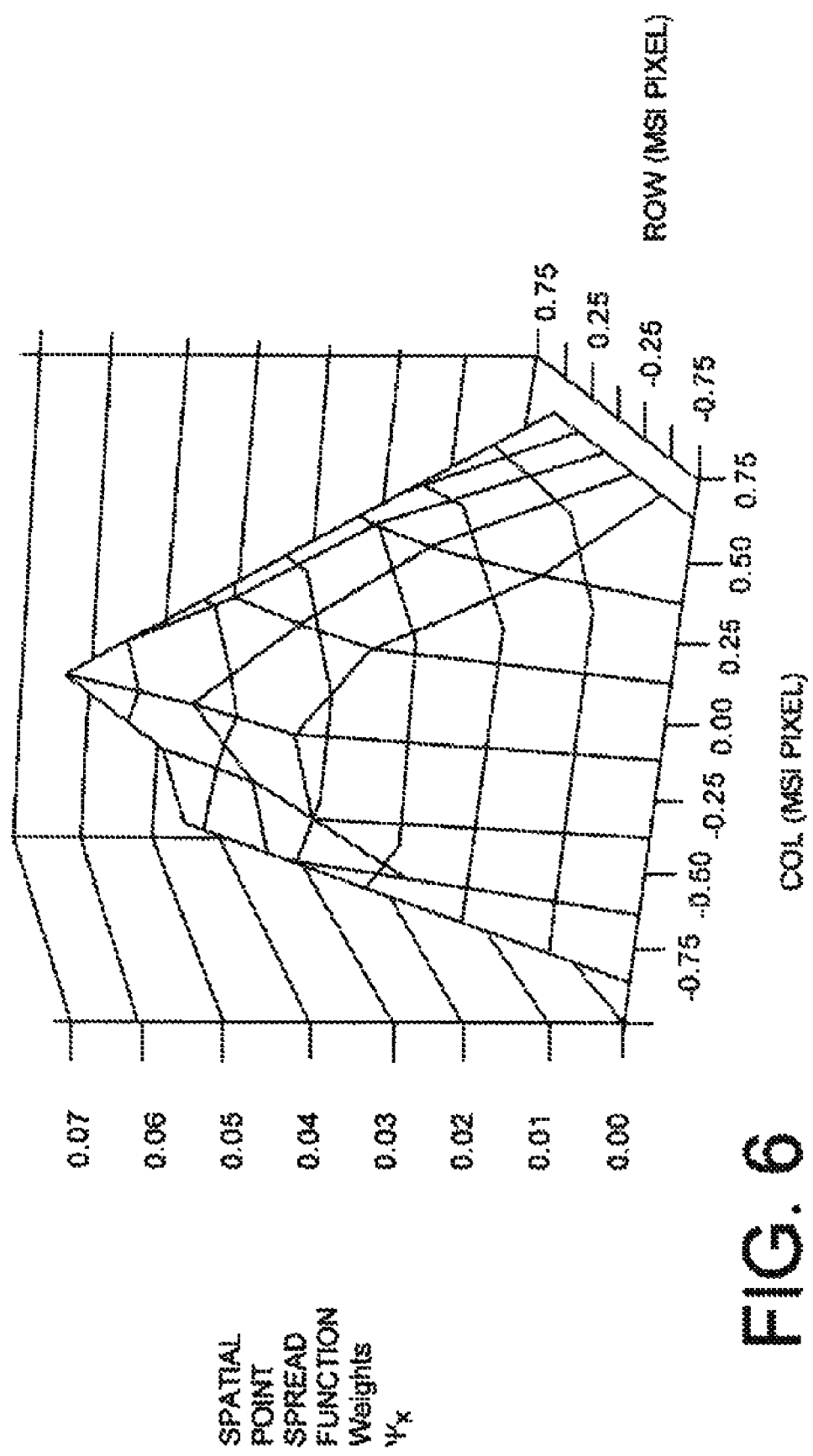
FIG. 6 is a two-dimensional graph which shows an example of a point spread function.

The PSF can be thought of as a mathematical function or table based characterization of the blurring that occurs to a point of light as it processed by the optics, sensor, and other image processing functions associated with the creation of the panchromatic image. FIG. 6 is a graphical representation of an example point spread function that is useful for understanding this concept. An accurate characterization or representation of the PSF can allow radiance values for different high-resolution pixels within a group of pixels to more accurately be down-sampled to a single larger pixel. This is conceptually illustrated in FIG. 5, which shows a set of four high-resolution pixels being down-sampled to a single larger lower resolution pixel. The PSF represented by $\psi_x$ operates as a selective weighting factor on each of the high resolution pixels $p_{00}$, $p_{01}$, $p_{10}$, $p_{11}$ to more accurately down-sample the radiance values of these pixels to a single value associated with a larger pixel P. More particularly, the radiance values for the pixels of the panchromatic image are convolved with the PSF to determine a down-sampled value for a single larger, lower resolution pixel.

The foregoing process can be mathematically expressed in Equation (2) as:

$$P = \sum_{i,j} p_{i,j} \Psi_{i,j}$$

where
P is the radiance value of the spatially down-sampled pixel,
$p_{i,j}$ is the radiance value of a high resolution pixel comprising the panchromatic image; and
$\Psi_{i,j}$ is the point spread function or PSF.

Equations (1) and (2) represent two ways of generating a down-sampled (lower resolution) panchromatic image. One approach begins with the multi-spectral image and the other approach begins with the panchromatic image. However, both approaches yield a panchromatic image. Accordingly, the foregoing Equations (1) and (2) can be used together to calculate the actual values for $W_\lambda$ (the spectral weights for each of the spectral bands) and $\Psi_{i,j}$ (the point spread function or PSF). For each down-sampled pixel, we have Equation (3):

$$\sum_{i,j} p_{i,j} \Psi_{i,j} = P = \sum_\lambda W_\lambda M_\lambda + P_0$$

Where:
$P_j$ is the pan radiance of each down-sampled pixel;
$W_\lambda$ is are the spectral weights for each of the spectral bands;
$M_\lambda$ is the radiance value for each pixel for each spectral band comprising the multi-spectral image;
$P_0$ is a constant offset value
$p_{i,j}$ is the radiance value of a high resolution pixel comprising the panchromatic image; and
$\Psi_{i,j}$ is the point spread function or PSF.

Using the foregoing equation (3), a matrix equation can be assembled for calculating the values $W_\lambda$ (the spectral weights for each of the spectral bands) and $\Psi_{i,j}$ (the point spread function).

We can rewrite equation (3), a linear combination of known intensities and unknown weights, as a linear system of equations for all pixels associated with the multi-spectral image in matrix from as the following $$Ax=b \quad \text{Equation (4)}$$

where A is the matrix populated by the specified radiance values from the panchromatic and multi-spectral images, x is a vector of unknowns (the PSF and spectral weights), and b is the vector of numerical constants (e.g. 0, 1.) The matrix equation (4) can thus be written as follows:

$$\begin{vmatrix} 1 & \cdots & 1 & 0 & \cdots & 0 & 0 \\ p_{0,0} & \cdots & p_{n,n} & -M_0 & \cdots & -M_h & -1 \\ \vdots & \vdots & \vdots & \vdots & \vdots & \vdots & \vdots \end{vmatrix} * \begin{vmatrix} \Psi \\ W \\ P_0 \end{vmatrix} = \begin{vmatrix} 1 \\ 0 \\ \vdots \end{vmatrix} \quad \text{Equation (5)}$$

Those skilled in the art will appreciate that the first n×n columns of the matrix are related to the portions of the high resolution panchromatic pixels which are modulated by the PSF, These values are the first n×n unknowns in the vector multiplied by the matrix. The next group of columns of the matrix are the negative of the MSI radiance values. These values are modulated by the spectral weights W and represent the next group of unknowns in the vector multiplied by the matrix. The last column of the matrix is a constant −1 for all values except the first row. This −1 value is used to account for the constant offset $P_0$, and represents the last unknown in the vector multiplied by the matrix.

The first row of the matrix equation imposes the constraint that n×n elements of the PSF sums to 1, which is a defining characteristic of a point-spread function. In this regard it may be noted that the first row of the constant vector on the far right of equation (5) is shown to have a value of 1. Also, in the first row of the matrix on the far left of equation (5), the values in the first group of columns are set to 1 whereas the values in the first row of the remaining columns are set to 0. These values are chosen in this way so as to select the first n×n unknowns which are the elements of the PSF.

The second row of the matrix equation enforces the requirement that the high resolution panchromatic radiance values spectrally down-sampled by the PSF ($p_{0,0} \ldots p_{n,n}$), equal the spectrally down-sampled MSI radiance values ($-M_0 \ldots -M_b$). The zero value in the second row of the constant vector on the far right of equation (5) reflects this balance. The structure of the second row is repeated as a separate row in the matrix equation for each pixel in the MSI image. Those skilled in the art will readily appreciate that a given row of this matrix reduces to Equation 3 for a specific pixel of the multi-spectral image.

$$p_{0,0}\Psi_{0,0} + \ldots + p_{n,n}\Psi_{n,n} - M_0 W_0 - \ldots - M_b W_b - P_0 = 0$$

Referring again to the flowchart shown in FIG. 2, the process continues in step 212 by solving the matrix equation (4) to determine the PSF weighting factors $\Psi_{i,j}$ and the spectral calibration weighting factors $W_\lambda$, including a constant offset $P_0$. The system of equations defined by matrix equation (4) is typically over determined due to the large number of pixels in the multi-spectral image and the relatively few unknown weights being sought. The solution to the equation is found by using conventional techniques, such as the well known least-squares method.

$$[A^t A]x = A^t b$$

Where multiplying from the left by the transpose of the matrix results in a symmetric matrix equation. There are many well know methods for efficiently solving matrix equations of this form. Since these techniques are well known in the art, they will not be described in detail here.

After the PSF and weighting factors for spectral calibration have been calculated, the process continues on to step 216. In step 216 a fused image is created. The fused image created in step 216 is not the final fused image created by the process in FIG. 2. Instead, the fused image created in step 218 can be thought of as a preliminary estimation or a starting point that is useful for further processing described below. The fused image is created in step 218 by up-sampling the multi-spectral image to the spatial resolution of the panchromatic image. This up-sampling process in step 216 is actually comprised of several intermediate steps 232 through 239 which are presented in FIG. 28.

Figure 2B:
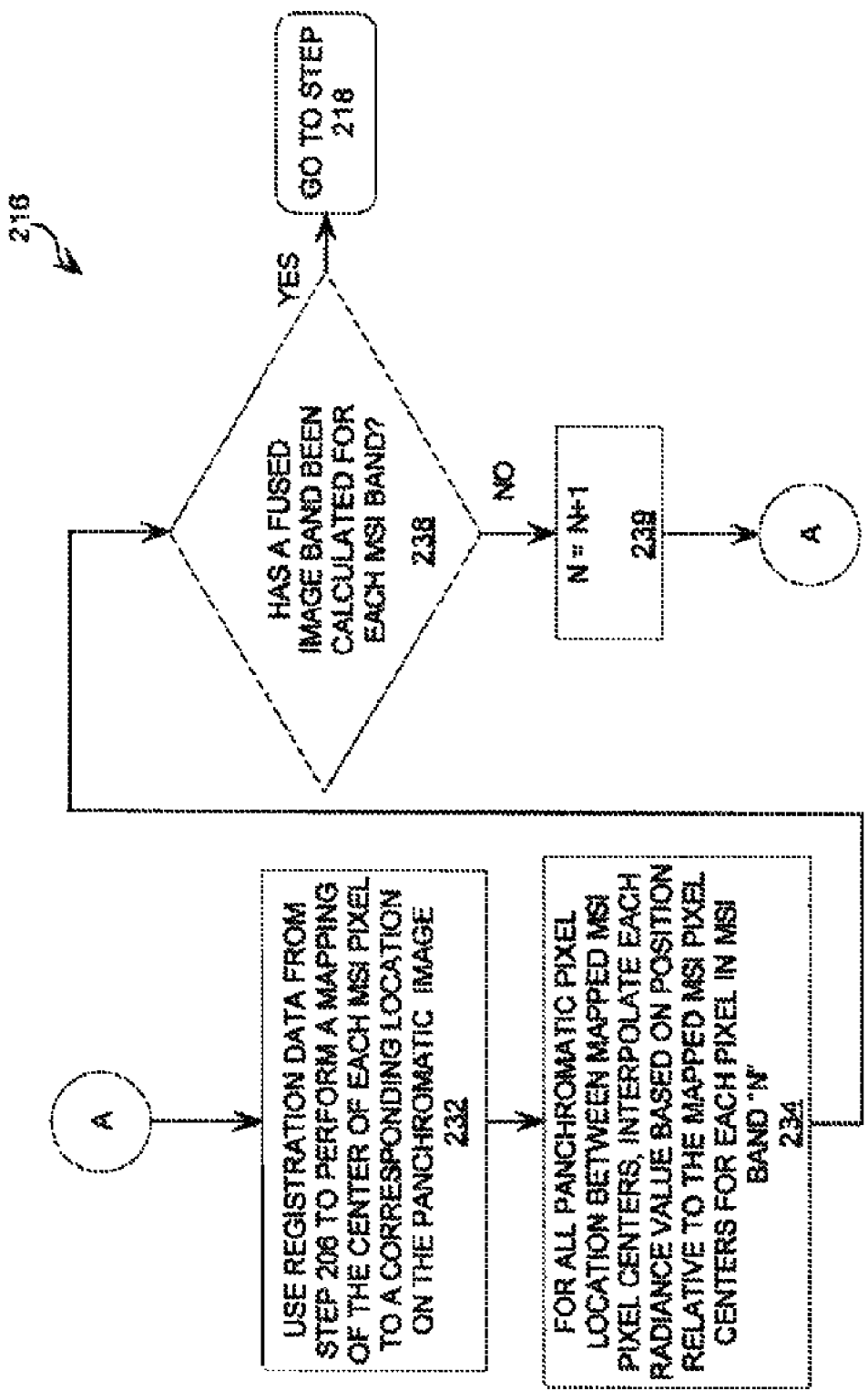
Figure 2C:
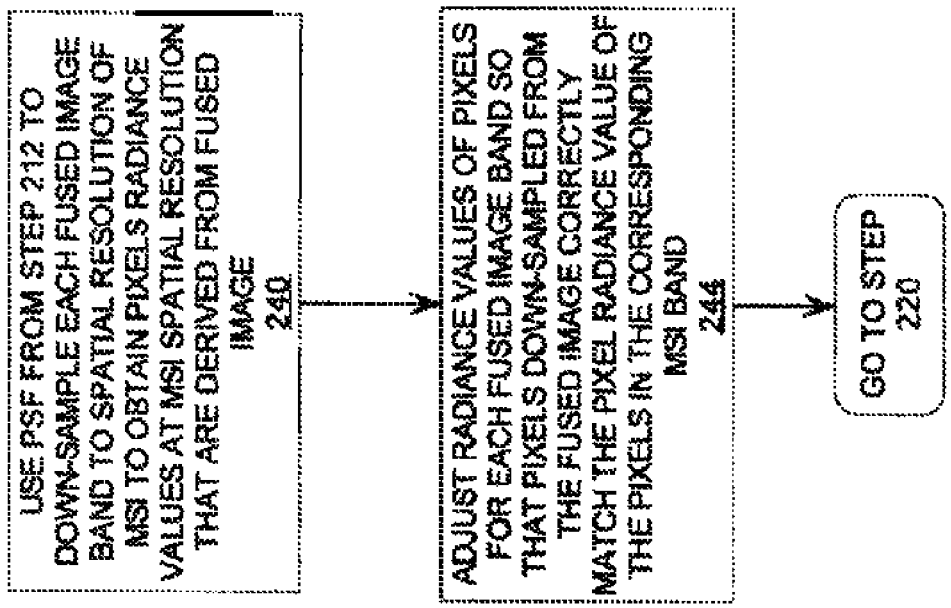

Referring now to FIG. 2B, it can be observed that the process described in step 218 can begin with step 232. In step 232, the registration data from step 208 is used to perform a mapping function. This mapping function involves mapping a center point of each pixel associated with the multi-spectral image to a corresponding location on the panchromatic image. There are many conventional mapping techniques that can be used for this process. Many of the pixel centers from the multi-spectral image will not be precisely aligned with the pixel locations of the panchromatic image. Accordingly, step 234 is an interpolation step for determining radiance values at panchromatic pixels located between the centers of pixels associated with the multi-spectral image. For such panchromatic pixel locations that are not exactly aligned with the centers of mapped multi-spectral image pixels, interpolated radiance values are computed. The result is to create a fused image band "N" corresponding to the multi-spectral image band "N". In step 238, a determination is made as to whether a fused image band has been created for each of the multi-spectral image hands. If not, the value of "N" is incremented in step 329 and the process is repeated for the next multi-spectral image band. When fused image bands have been created for each multi-spectral image, the initialization of the fused image is completed and the process returns to step 218 in FIG. 2A.

In step 218, the process continues by constraining the radiance values of the pixels forming the fused image so that they are consistent with the radiance values of the multi-spectral image. In this context, the values are said to be "consistent" if the radiance values of pixels from the fused image band, when down-sampled to the spatial resolution of the multi-spectral image, are equal to the radiance values for pixels at the same geometric location in the corresponding multi-spectral image hand. The process of obtaining consistency as referred to in step 218 is actually comprised of several steps, 240 through 244, as shown in FIG. 20. In step 240, the PSF calculated in step 212 is used to down-sample each fused image band to the spatial resolution of the multi-spectral image. In particular, this down-sampling process can be performed using Equation 2. The down-sampling process produces radiance values for the down-sampled pixels at the spatial resolution of the multi-spectral image. Initially, however, the radiance values for the down-sampled pixels generally will not match the radiance values for the corresponding pixels of the multi-spectral image. Accordingly, in step 244, the radiance values for pixels of the fused image bands are adjusted. In particular, the radiance values of pixels from the fused image band are adjusted so that when they are down-sampled to the spatial resolution of the multi-spectral image, the pixel radiance values of the down-sampled pixels will more closely match the pixel radiance values for the corresponding multi-spectral image band at the same geometric location in the image. The various steps involved in this process are described in more detail in FIG. 2D.

Referring now to FIG. 2D, it can be observed that step 244 is comprised of steps 280 through 288. In step 280, a first fused image band "M" is-selected. In step 262, the process continues by calculating a scaling factor for each fused image band pixel. The scaling factor is preferably determined based on a ratio of the radiance value for each pixel of the multi-spectral image in band "M" to the radiance value of a corresponding pixel down-sampled from the fused image band "M". In step 264, the scaling factor is applied to the pixels of the fused image band "M" that were down-sampled in step 240. In step 266, a determination is made as to whether the scaling has been completed for all fused image hands. If not, the fused image band "M" is incremented in step 288 and the process returns to step 282 to calculate scaling values for the next band. If scaling values have been calculated for all fused image bands, then the process returns to step 220 in FIG. 2A.

In step 220, each band comprising the fused image is spatially blurred. Blurring is a common technique used in image processing and there are many conventional methods by which spatial blurring can be performed. Accordingly, blurring will not be described here in detail. However, those skilled in the art will appreciate that spatial blurring as described herein can include using a convolution process. Convolution is the modification of a pixel's value on the basis of the value of neighboring pixels, in a basic box blurring process, images are convolved by multiplying each pixel and its neighbors by a numerical matrix, called a kernel. For example, a 3×3 matrix could be used for this purpose. This matrix is essentially applied to localized groups of adjacent pixels in the image. Each pixel in the group is multiplied by the appropriate matrix value, the total is summed and normalized, and the central pixel in the group is replaced by the result. Still, it should be appreciated that there are a number of different techniques that are commonly used for blurring. Any of these techniques can be used with the present invention, provided that they produce a desired blurring effect. The purpose of the foregoing blurring is to smooth the image.

In order to more fully understand the purpose of the foregoing blurring, it should be understood that merely imposing the constraints that the fused image down-sample spectrally to the original panchromatic image is not generally sufficient to obtain a unique solution for the radiance values of the fused image. Instead, the present invention seeks to provide the smoothest fused image subject to these constraints. Specifically, it is preferable to minimize the second derivative of each band at each fused pixel in four directions, namely: horizontal, vertical and the two diagonals. This blurring significantly reduces the artifacts associated with discontinuities across MSI pixel boundaries, even when the panchromatic pixel radiance values vary smoothly across the boundary. Advantageously, use of the 3×3 operator described above, and the other constraints described herein, are imposed every iteration. Accordingly, over-smoothing is prevented and cannot occur. The final fused image has all of the high spatial frequency components of the panchromatic image. Thus, it will be appreciated that the smoothing operation described herein avoids over-sharpening the fused image, which can result in high frequency artifacts, such as MSI blocks or speckle.

After the blurring function is applied to the image in step 220, the process in FIG. 2A continues on to step 222. In step 222, the radiance values of the fused image are adjusted so that they are consistent with the pixel values of the panchromatic image. In other words, the fused image pixel values are adjusted so that, when spectrally down-sampled to the panchromatic image, the resulting down-sampled pixels have radiance values that are consistent with the pixel values of the panchromatic image. This process is actually comprised of several steps which are disclosed in further detail in relation to FIGS. 2E and 2F.

Figure 2E:
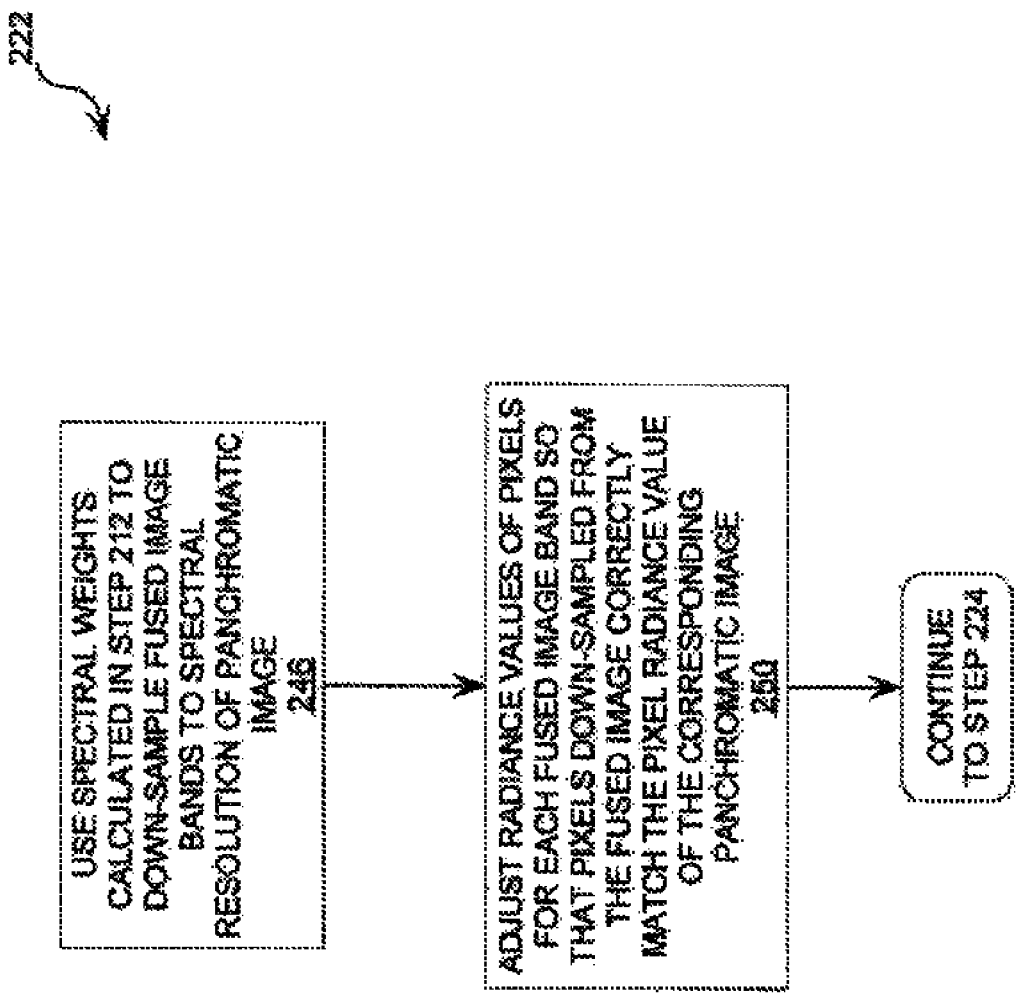

Referring now to FIG. 2E, the process can continue with step 248. In step 246, the spectral weights previously calculated in step 212 are used to down-sample the fused image bands to the spectral resolution of the panchromatic image. This process is performed using Equation 1.

The down-sampling process produces radiance values for the down-sampled pixels at the spectral resolution of the panchromatic image. Initially, however, the radiance values for the down-sampled pixels generally will not be consistent with the radiance values for the corresponding pixels of the panchromatic image. In this context, the values are said to be "consistent" if the radiance values of pixels from the fused image bands, when down-sampled to the spectral resolution of the multi-spectral image, are equal to the radiance values for pixels at the same geometric location in the corresponding panchromatic image. Accordingly, in step 250, the radiance values for pixels of the fused image bands are adjusted to obtain such consistency. In particular, the radiance values of pixels from the fused image band are adjusted so that when they are down-sampled to the spectral resolution of the panchromatic image, the pixel radiance values of the down-sampled pixels will more match the pixel radiance values for the panchromatic image. The various steps involved in this process are described in more detail in FIG. 2F.

Referring now to FIG. 2F, step 250 will be described in greater detail in steps 270 through 278. In step 270, a first fused image band "M" is selected. In step 272, the process continues by calculating a scaling factor for each fused image band pixel. The scaling factor is preferably determined based on a ratio of the radiance value for each pixel of the panchromatic image to the radiance value of a corresponding pixel down-sampled from the fused image bands. In step 274, the scaling factor is applied to the pixels of the fused image band "M" that was down-sampled in step 246. In step 278, a determination is made as to whether the scaling has been completed for all fused image bands. If not, the fused image band "M" is incremented in step 278 and the process returns to step 272 to calculate scaling values for the next band. If scaling values have been calculated for all fused image bands, then the process returns to step 224 in FIG. 2A.

In step 224, a determination is made as whether the radiance values of the fused image have converged. This determination can involve a determination as to whether the adjusted radiance values of the fused image in step 218 are sufficiently close in value to the adjusted radiance values of the fused image obtained in step 222. If a sufficiently high degree of convergence is not found in step 224, then the process can return to step 218 through 222 for further adjustment of the fused image pixel radiance values.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein white the same or similar results would be achieved. All such similar substitutes and modifications apparent to those skilled in the art are deemed to be within, the spirit, scope and concept of the invention as defined.

We claim:

1. A method for creating a fused image from an image pair comprising a panchromatic image and a multi-spectral image, comprising:
obtaining image data defining a first image of a panchromatic image type, said first image having a first spatial resolution and a first spectral resolution;
obtaining image data defining a second image of a multi-spectral image type, said second image having a second spatial resolution lower than said first spatial resolution and a second spectral resolution higher than said first spectral resolution;
concurrently calculating a point spread function for down-sampling said first image to said second spatial resolution, and a set of weights for down-sampling said second image to said first spectral resolution, said point spread function and said set of weights specifically optimized to the unique characteristics of the image pair;
fusing said first image and said second image to initialize a fused image having said first spatial resolution and said second spectral resolution; and
using said point spread function and said set of weights to determine scaling factors for scaling radiance value of pixels defining said fused image to provide consistency with radiance value of pixels forming said first image and said second image.

2. A method for creating a fused image from an image pair comprising a panchromatic image and a multi-spectral image, comprising:
obtaining image data defining a first image of a panchromatic image type, said first image having a first spatial resolution and a first spectral resolution;
obtaining image data defining a second image of a multi-spectral image type, said second image having a second spatial resolution lower than said first spatial resolution and a second spectral resolution higher than said first spectral resolution;
concurrently calculating a point spread function for down-sampling said first image to said second spatial resolution, and a set of weights for down-sampling said second image to said first spectral resolution said point spread function and said set of weights specifically optimized to the unique characteristics of the image pair;
fusing said first image and said second image to initialize a fused image having said first spatial resolution and said second spectral resolution; and
using said point spread function and said set of weights to determine scaling factors for scaling radiance value of pixels defining said fused image to provide consistency with radiance value of pixels forming said first image and said second image;
wherein said calculating step further comprises calculating said point spread function and said set of weights so as to minimize the squared error of radiance when each of the images comprising the image pair are mapped to a common low resolution image.

3. The method according to claim 2, further comprising selecting said common low resolution to be comprised of the second spatial resolution and said first spectral resolution.

4. A method for creating a fused image from an image pair comprising a panchromatic image and a multi-spectral image, comprising:
obtaining image data defining a first image of a panchromatic image type, said first image having a first spatial resolution and a first spectral resolution;
obtaining image data defining a second image multi-spectral image type, said second image having a second spatial resolution lower than said first spatial resolution and a second spectral resolution higher than said first spectral resolution;
concurrently calculating a point spread function for down-sampling said first image to said second spatial resolution, and a set of weights for down-sampling said second image to said first spectral resolution, said point spread function and said set of weights specifically optimized to the unique characteristics of the image pair;
fusing said first image and said second image to initialize a fused image having said first spatial resolution and said second spectral resolution; and
using said point spread function and said set of weights to determine scaling factors for scaling radiance value of pixels defining said fused image to provide consistency with radiance value of pixels forming said first image and said second image;
wherein said calculating step further comprises concurrently solving for $\Psi_{i,j}$ and $W_{80}$ in the equation $$\sum_{i,j} p_{i,j}\Psi_{i,j} = P = \sum_{\lambda} W_{\lambda}M_{\lambda} + P_0$$

where P is the radiance of a pixel down-sampled to said second spatial resolution, $W_\lambda$ is the spectral weight for a spectral band $\lambda$ comprising said multi-spectral image, $M_\lambda$ is the radiance value of a pixel for each spectral band comprising the second image, $P_0$ is a constant offset value, $p_{i,j}$ is the radiance value of a pixel comprising the panchromatic image: and $\Psi_{i,j}$ is the point spread.

5. The method according to claim 4, further comprising building a matrix equation for concurrently solving for $\Psi_{i,j}$ and $W_\lambda$.

6. The method according to claim 5, further comprising solving said matrix equation using a least squares fit method.

7. The method according to claim 1, further comprising the step of registering said first and second image to provide a geometric mapping of pixels in said first image to locations in said second image.

8. The method according to claim 1, wherein said fusing step further comprises up-sampling the second image to said first spatial resolution.

9. The method according to claim 8, wherein said up-sampling step is comprised of mapping the centers of each pixel of said second image to a corresponding geometric location in the first image as determined by a registration process.

10. The method according to claim 9, wherein said up-sampling step is further comprised of determining a radiance value of each said pixel comprising said fused image based on said radiance values of said second image.

11. The method according to claim 10, wherein said up-sampling step is further comprised of determining said radiance value for each pixel comprising said fused image, and located between said centers of said pixels of said second image, by using an interpolation process.

12. A method for creating a fused image from an image pair comprising a panchromatic image and a multi-spectral image, comprising:
obtaining image data defining a first image of a panchromatic image type, said first image having a first spatial resolution and a first spectral resolution;
obtaining image data defining a second image of a multi-spectral image type, said second image having a second spatial resolution lower than said first spatial resolution and a second spectral resolution higher than said first spectral resolution;
concurrently calculating a point spread function for down-sampling said first image to said second spatial resolution, and a set of weights for down-sampling said second image to said first spectral resolution, said point spread function and said set of weights specifically optimized to the unique characteristics of the image pair;
fusing said first image and said second image to initialize a fused image having said first spatial resolution and said second spectral resolution; and
using said point spread function and said set of weights to determine scaling factors for scaling radiance value of pixels defining said fused image to provide consistency with radiance value of pixels forming said first image and said second image;
wherein said scaling step comprises the steps of:
scaling said pixel radiance values of said fused image to be consistent with the pixel radiance values of the second image;
blurring the fused image; and
scaling the pixel radiance values of the fused image to be consistent with the pixel radiance value of the first image.

13. The method according to claim 12, wherein said step of scaling said radiance values of said fused image to be consistent with the pixel radiance values of said second image is comprised of using said point spread function to spatially down-sample the fused image to said second spatial resolution, and then enforcing consistency of radiance values of each optical band of said fused image with the radiance values of each band of the second image.

14. The method according to claim 13, wherein said enforcing step comprises automatically modifying said radiance values of pixels comprising said fused image so that radiance values of pixels down-sampled from the fused image to said second spatial resolution are equal to the radiance values of corresponding pixels in the second image.

15. The method according to claim 14, wherein said enforcing step further comprises calculating said scaling factor for each pixel comprising a fused image band.

16. The method according to claim 15, wherein said calculating step comprises calculating a ratio of the radiance value of each pixel comprising a band of said second image to the radiance value of a pixel spatially down-sampled from a corresponding fused image band.

17. The method according to claim 16, further comprising repeating said enforcing step for each fused image band.

18. The method according to claim 12, wherein said step of scaling the pixel radiance values of the fused image to be consistent with the pixel radiance value of the first image further comprises using said set of weights to spectrally down-sample the fused image to said first spectral resolution, and then enforcing consistency of radiance values of each pixel of said fused image with the radiance values of each pixel of said first image.

19. The method according to claim 18, wherein said enforcing step comprises automatically modifying said radiance values of pixels comprising said fused image so that radiance values of pixels down-sampled from the fused image bands to said first spectral resolution are consistent with the radiance values of corresponding pixels in the first image.

20. The method according to claim 19, wherein said enforcing step further comprises calculating a scaling factor for each said fused image band.

21. The method according to claim 20, wherein said calculating step comprises calculating a ratio of the radiance values of each said pixel comprising said first image to the radiance value of a corresponding pixel spectrally down-sampled from said fused image bands and having a common geometric location.

22. The method according to claim 21, further comprising repeating said enforcing step for each of said fused image bands.

23. The method according to claim 12, further comprising repeating said scaling steps until the radiance values of each pixel comprising said fused image respectively converges to a single value.

24. A method for creating a fused image from an image pair comprising a panchromatic image and a multi-spectral image, comprising:
obtaining image data defining a first image of a panchromatic image type, said first image having a first spatial resolution and a first spectral resolution;
obtaining image data defining a second image of a multi-spectral image type, said second image having a second spatial resolution lower than said first spatial resolution and a second spectral resolution higher than said first spectral resolution;
concurrently calculating a point spread function for down-sampling said first image to said second spatial resolution, and a set of weights for down-sampling said second image to said first spectral resolution, said point spread function and said set of weights specifically optimized to the unique characteristics of the image pair;

fusing said first image and said second image to initialize a fused image having said first spatial resolution and said second spectral resolution;

down-sampling said fused image to said second spatial resolution using said point spread function scaling a plurality of pixel radiance values of said fused image to be consistent with a plurality of pixel radiance values of the second image;

blurring the fused image;

down-sampling said fused image to said first spectral resolution using said set of weights; and scaling the plurality of pixel radiance values of the fused image to be consistent with a plurality of pixel radiance value of the first image.

25. The method according to claim 24, further comprising repeating said scaling and said blurring steps until each of said pixel radiance values of the fused image respectively converge to a final radiance value.

26. A system for creating a fused image from an image pair comprising a panchromatic image and a multi-spectral image, comprising:

a data store for storing image data defining a first image of a panchromatic image type, said first image having a first spatial resolution and a first spectral resolution, and image data defining a second image of a multi-spectral image type, said second image having a second spatial resolution lower than said first spatial resolution and a second spectral resolution higher than said first spectral resolution; and processing means for:

concurrently calculating a point spread function for down-sampling said first image to said second spatial resolution, and a set of weights for down-sampling said second image to said first spectral resolution, said point spread function and said set of weights specifically optimized to the unique characteristics of the image pair;

fusing said first image and said second image to initialize a fused image having said first spatial resolution and said second spectral resolution; and determining scaling factors for scaling radiance value of pixels defining said fused image in accordance with radiance value of pixels forming said first image and said second image by using said point spread function and said set of weights to down-sample said fused image to said first spectral resolution and said second spatial resolution.

* * * * *